United States Patent [19]

Honda

[11] Patent Number: 4,975,614
[45] Date of Patent: Dec. 4, 1990

[54] ULTRASONIC DRIVING DEVICE

[75] Inventor: Keisuke Honda, Aichi, Japan

[73] Assignee: Honda Electric Co., Ltd., Aichi, Japan

[21] Appl. No.: 398,328

[22] Filed: Aug. 23, 1989

Related U.S. Application Data

[63] Continuation of Ser. No. 164,058, Mar. 3, 1988, abandoned.

[30] Foreign Application Priority Data

| Mar. 18, 1987 | [JP] | Japan | 62-63460 |
| Mar. 28, 1987 | [JP] | Japan | 62-46056[U] |
| Jul. 1, 1987 | [JP] | Japan | 62-164625 |
| Jul. 6, 1987 | [JP] | Japan | 62-168409 |
| Jul. 9, 1987 | [JP] | Japan | 62-172001 |

[51] Int. Cl.$^5$ .......................... H01L 41/08
[52] U.S. Cl. .................. 310/323; 310/325; 310/333
[58] Field of Search ............... 310/323, 325, 328, 333

[56] References Cited

U.S. PATENT DOCUMENTS

| 3,140,859 | 7/1964 | Scarpa | 310/325 X |
| 3,218,488 | 11/1965 | Jacke | 310/325 |
| 3,370,186 | 2/1968 | Antonevich | 310/325 |
| 3,421,939 | 1/1969 | Jacke | 310/325 |
| 3,772,538 | 11/1973 | Supitilov | 310/325 |
| 3,778,758 | 12/1973 | Carson | 310/325 X |
| 4,065,687 | 12/1977 | Mishiro | 310/325 X |
| 4,193,009 | 3/1980 | Durley, III | 310/325 X |
| 4,210,837 | 7/1980 | Vasiliev et al. | 310/325 X |
| 4,562,374 | 12/1985 | Sashida | 310/328 |
| 4,642,509 | 2/1987 | Kumada | 310/328 X |
| 4,663,556 | 5/1987 | Kumada | 310/328 X |
| 4,697,117 | 9/1987 | Mishiro | 310/325 X |
| 4,703,214 | 10/1987 | Mishiro | 310/328 |
| 4,705,980 | 11/1987 | Mishiro | 310/325 X |
| 4,728,843 | 3/1988 | Mishiro | 310/325 |

FOREIGN PATENT DOCUMENTS

| 2120654 | 11/1971 | Fed. Rep. of Germany | 310/325 |
| 0054885 | 3/1986 | Japan | 310/323 |
| 0060480 | 3/1987 | Japan | 310/323 |
| 0076399 | 4/1987 | Japan | 310/325 |
| 0217875 | 9/1987 | Japan | 310/323 |

Primary Examiner—Mark O. Budd
Attorney, Agent, or Firm—Burgess, Ryan & Wayne

[57] ABSTRACT

A stator includes piezoelectric vibrators of piezoelectric ceramic put between a long metal block and a short metal block, which are fixed with screw threads at opposite ends of a bolt. When a high frequency alternating current voltage is applied to the piezoelectric vibrators, elliptic compounded vibration, progressive vibration and so on, which is torsional vibration due to the screw threads of the bolt compounded with longitudinal vibration due to the expansion and contraction of the piezoelectric vibrators, is generated on the end surface and the side surface of the stator. A driven member is engaged on the end surface or the side surface of the stator and is driven by the elliptic vibration.

14 Claims, 12 Drawing Sheets (a)

(b)

(c)

Fig. 23
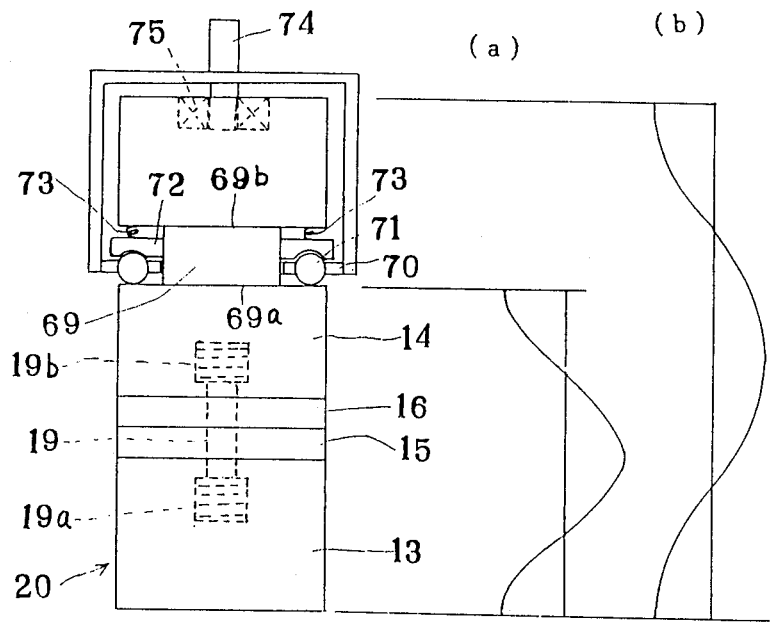
Fig. 24
Fig. 25
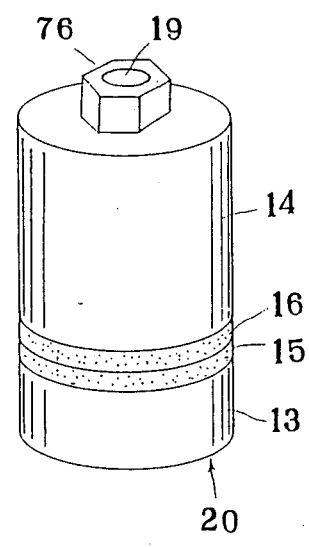
Fig. 26
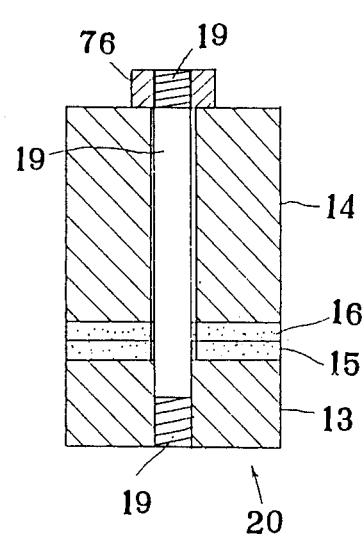

1

ULTRASONIC DRIVING DEVICE

This application is a continuation of application Ser. No. 164,058, filed Mar. 3, 1988, now abandoned.

BACKGROUND OF THE INVENTION

The present invention relates to an ultrasonic driving device using a ring type piezoelectric vibrator.

In a known ultrasonic motor using a piezoelectric vibrator, two groups of electrodes are attached to one side of a ring type piezoelectric ceramic, the two group of electrodes are so positioned that standing waves respectively generated by the two groups of electrodes are shifted every $\pi/2$ in each position. The parts of the ring type piezoelectric vibrator corresponding to the electrode are alternately polarized in reverse. Also, the two groups of the electrodes are respectively connected to two oscillators for respectively generating alternating current voltages having a $\pi/2$ phase shift with respect to each other. When the alternating current voltages from the two oscillators are respectively applied to the two groups of electrodes, the two standing waves having $\pi/2$ phase shift with respect to each other are generated on the surfaces of the ring type piezoelectric vibrator and then progressive waves owing to a compound of the two standing waves are generated on the surfaces of the ring type piezoelectric vibrator. Therefore, when a rotary member is put on the ring type piezoelectric vibrator and the rotary member is strongly pressed to the ring type piezoelectric vibrator, the rotary member is rotated by the progressive waves.

In the prior ultrasonic motor, since the ring type piezoelectric vibrator must be polarized in many portions thereof and the two oscillators must be connected to the electrodes, the composition of the ring type piezoelectric vibrator is complex and the cost of the ultrasonic motor becomes expensive.

There is known as ultrasonic motor comprising a Langevin type; vibrator having two ring type piezoelectric vibrators put between two metal blocks. In this ultrasonic motor, a twisting joint body is connected to the end of one metal block by a bolt for fixing the metal blocks and the piezoelectric vibrator and a rotary member is pressed on the twisting joint body by a spring.

However, the composition of the ultrasonic motor is complex and its cost becomes expensive.

SUMMARY OF THE INVENTION

It is, therefore, the primary object of the present invention to provide an ultrasonic driving device having a simple composition.

It is another object of the present invention to provide an ultrasonic driving device having a stator of an unsymmetrical Langevin type vibrator comprising one metal block longer than the other metal block.

It is another object of the present invention to provide an ultrasonic driving device for driving a driven member by elliptic vibration comprising a compound vibration superposed by torsional vibration to a longitudinal vibration, progressive wave and so on, the elliptic vibration being on the end surface and the side surface of a stator due to a screw of the bolt fixed to two metal blocks and a piezoelectric vibrator.

In order to accomplish the above and other objects, the present invention provides a stator comprising a long metal block and a short metal block, a piezoelectric vibrator or piezoelectric vibrators put between the long metal block and the short metal block and a bolt for fixing the metal blocks and the piezoelectric vibrator or piezoelectric vibrators by means of screw threads on both sides thereof, an alternating current power supply for generating high frequency electric signals, and a driven member engaged with the end surface or side surface of the stator, whereby elliptic vibrations superposed by torsional vibration due to the screw threads of the bolt to longitudinal vibration due to the expansion and contraction of the piezoelectric vibrator is generated on the end surface or side surface of the stator and the driven member is driven by the elliptic vibration.

BRIEF DESCRIPTION OF THE DRAWINGS

FIG. 23 shows a side view of an ultrasonic motor of another embodiment of the present invention.

FIG. 24 shows a longitudinal wave and torsional wave generated in a stator consisting of an unsymmetrical Langevin type vibrator in FIG. 23.

FIG. 25 shows a perspective view of a stator of another embodiment of the present invention.

FIG. 26 shows a sectional side view of the stator in FIG. 25.

FIGS. 27 (b) and (c) shows a elliptic vibration generated in the stator in FIG. 25.

FIG. 27 (d) shows a direction generating elliptic vibration and torsional vibration.

DESCRIPTION OF THE PREFERRED EMBODIMENTS

Figure 1:
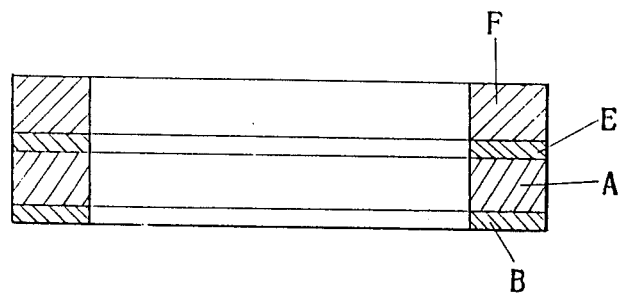
FIG. 1 shows a sectional view of an ultrasonic motor in the prior art.
Figure 2:
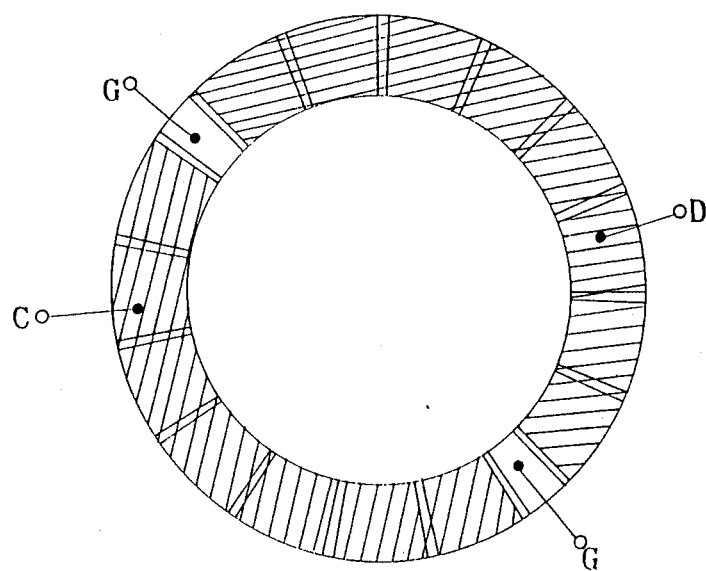
FIG. 2 shows a plain view of a form of a piezoelectric vibrator and a composition of electrodes of the piezoelectric vibrator.

Referring to the prior art in FIG. 1, a ring type piezoelectric vibrator B is attached to a ring type resilient member A and the piezoelectric vibrator B vibrates the resilient member A in unison. The piezoelectric vibrator B is divided into 17 parts by the ratio of e.g. 22.5° or 11.25°. The neighbouring portions in the 17 parts of the piezoelectric vibrator B are polarized by a reverse polarity to each other as shown in FIG. 2. The two portions C and D in the one side of the piezoelectric vibrator B are respectively attached as an electrode by conductive paint as shown in FIG. 2. The portion G in FIG. 2 shows an earth electrode. The member F to be driven to which a slider E is attached is mounted on the resilient member A.

In the ultrasonic motor in the prior art, the alternating current voltage of $V_0 \sin \omega t$ is applied to the one electrode C and the alternating current voltage $V_0 \cos \omega t$ is applied to the other electrode D, where $V_0$ is the instantaneous value, $\omega$ is radian frequency and t is time. The phases of these voltages shift by $\pi/2$ with respect to each other. Thereby, the divided portions of the piezoelectric vibrator B alternately produce expansion and contraction and thus, the piezoelectric vibrator B produces a bending vibration. Therefore, a standing wave is generated in the piezoelectric vibrator B and a progressive wave is generated on the piezoelectric vibrator B. Thus, the driven member F having the slider E is rotated on the resilient member A.

However, in the prior ultrasonic motor, because the divided portions of the ring type piezoelectric vibrator B must be alternately polarized and the divided electrodes must be formed on the divided portion of the piezoelectric vibrator B, the composition of the prior ultrasonic motor is complex.

Figure 3:
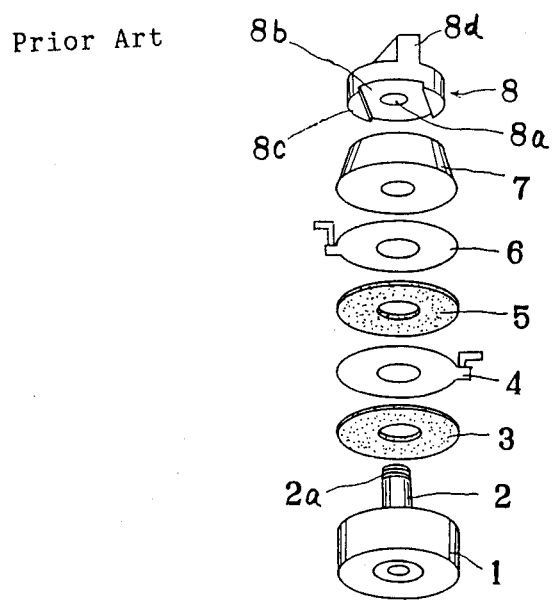
FIG. 3 shows a separated perspective view of the stator of an ultrasonic motor in the prior art.

Referring to the prior art in FIG. 3, a piezoelectric vibrator 3, a terminal plate 4, a piezoelectric vibrator 5, a terminal plate 6 and an aluminum disk 7 are put on a washer 1 and a bolt 2 is inserted into the center holes of these members. The screw 2a of the bolt 2 is engaged with the screw hole 8a of a twisting joint body 8. A drain 8b is formed on the under surface of the twisting joint body 8, arcuate projections 8c are formed in both sides of drain 8b, and a beam 8d is so formed in the upper portion of the twisting joint body 8 that an angle between the beam 8d an drain 8b becomes a predetermined value.

In this prior ultrasonic driving device, when alternating current voltage is applied through the terminal plates 4 and 6 to the piezoelectric vibrators 3 and 5 and the piezoelectric vibrators 3 and 5 are vibrated in the direction of their thickness, the arcuate projections 8c of the twisting joint body 8 are pushed and twisted by the vibration of the piezoelectric vibrators 3 and 5. Therefore, the twisting joint body 8 is vibrated to be twisted. When the excitation frequency of the alternating current voltage approaches a resonance frequency, elliptic vibration arises on the beam 8d of the twisting joint body 8.

Figure 4:
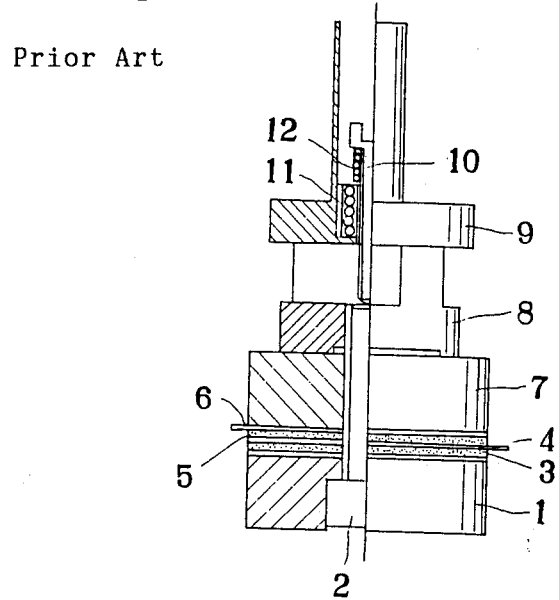
FIG. 4 shows a side view having a partial sectional view of an ultrasonic motor in the prior art.

Therefore, as shown in FIG. 4, a rotary member 9 is put on the twisting joint body 8, a center bolt 10 passed through a bearing 11 of the rotary member 9 and is fixed to the twisting joint body 8, and a spring 12 is attached between the upper end of the bolt 10 and the bearing 11, whereby the rotary member 9 is strongly touched on the beam 8d of the twisting joint body 8 and is rotated by the elliptic vibration on the beam 8d.

However, in the prior ultrasonic motor, the composition of the twisting joint body 8 is complex and strong torque cannot be obtained by the composition of the ultrasonic motor.

Figure 5:
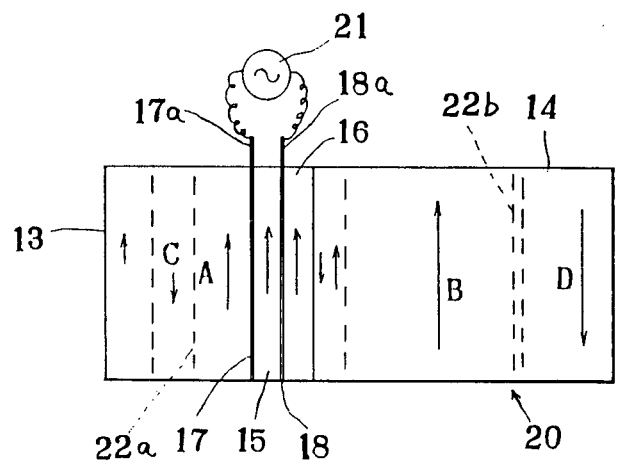
FIG. 5 shows a side view of a stator of an ultrasonic driving device for explaining the principle of the present invention.
Figure 6:
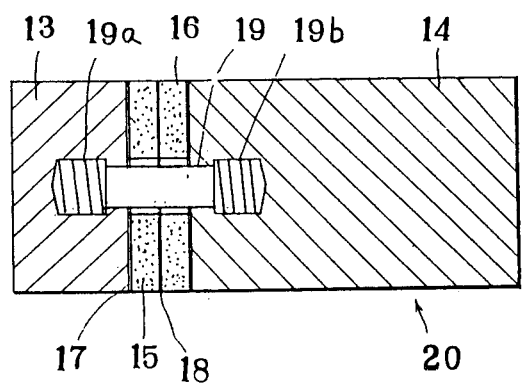
FIG. 6 shows a sectional view of a stator of an ultrasonic driving device in the present invention.

Referring to FIG. 5, a stator 20 in the ultrasonic driving device of the present invention consists of a short metal block 13, a long metal block 14, ring type piezoelectric vibrators 15 and 16 of piezoelectric ceramics and so on and electrodes 17 and 18. The piezoelectric vibrators 15 and 16 and the electrodes 17 and 18 are inserted between the short metal block 13 and long metal block 14, and the short metal block 13 and long metal block 14 are fixed in unison by respectively engaging the screw holes of these blocks 13 and 14 with the screws 19a and 19b of a bolt 19 as shown in FIG. 6.

When alternating current voltage is applied from an alternating current power supply 21 through the electrodes 17 and 18 to the piezoelectric vibrators 15 and 16 of the stator 20, it is confirmed that elliptic vibration generates on the side of the stator 20 to the direction the arrows as shown in FIG. 5.

Explaining the principle for generating the elliptic vibration on the stator 20, when the alternating current voltage is applied to the terminals 17a and 18a of the electrodes 17 and 18, the piezoelectric vibrators 15 and 16 vibrate in expansion and contraction. When the piezoelectric vibrators 15 and 16 expand longitudinally, the metal blocks 13 and 14 are longitudinally compressed and then these side surfaces of the metal blocks 13 and 14 expand. Also, because the screw holes of the metal blocks 13 and 14 and the screws 19a and 19b of the bolt 19 are obliquely formed, twist arises in the metal blocks 13 and 14 by the expansion of the piezoelectric vibrators 15 and 16 and each oblique thread of the screws 19a and 19b of the bolt 19 and elliptic vibrations A and B arise on the side surfaces of the metal blocks 13 and 14 as shown by the arrows of FIG. 5. By the reaction of these elliptic vibrations A and B, the reverse elliptic vibrations as shown by arrows C and D respectively arise apart from dead zones 22a and 22b. The elliptic vibration B arising in the long metal block 14 is stronger than the elliptic vibration A in the short metal block 13. The directions of these elliptic vibrations A–D are decided by the right-hand screw or left-hand screw of the screw holes of the metal blocks 13 and 14 and by the oblique direction of the pitch of the thread of the screws 19a and 19b of the bolt 19.

Figure 7:
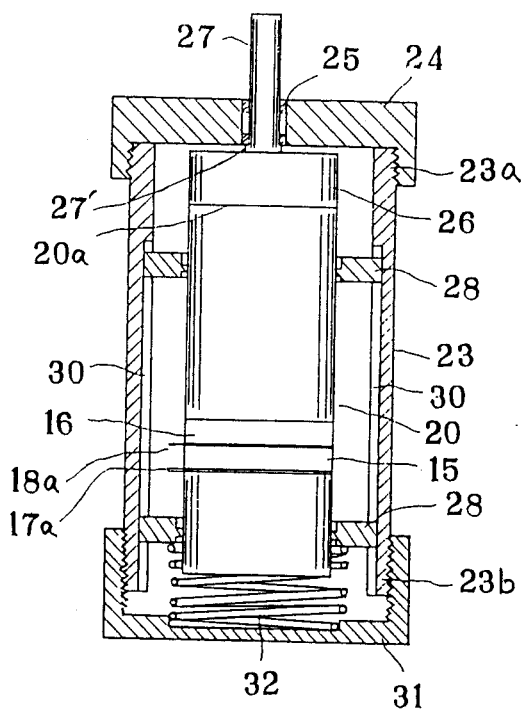
FIG. 7 shows a side view of an ultrasonic motor in the present invention.
Figure 8:
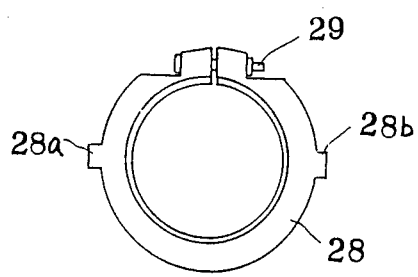
FIG. 8 shows a plain view of a supporting plate for fixing a stator of the present invention.

Referring to FIG. 7, an ultrasonic motor of the present invention using the stator 20 is shown. A cap member 24 is fixed in the end 23a of a case 23 by means of its screw and the rotary shaft 27 of the rotary member 26 is supported to rotate by a bearing 25 attached to the cap member 24. The portion 27' of the rotary shaft 27, which is near to the rotary member 26, is bigger than the other portion and even if the rotary member 26 is pressed vertically, the rotary member 26 is untouched to the cap member 24. The stator 20 is supported in its dead zone by two ring supporters 28 which are fixed by screws 29 as shown in FIG. 8. Opposed projections 28a and 28b of the ring supporters 28 are respectively inserted in drains 30 and thus the ring supporters 28 are supported in the case 23 to be longitudinally moved, but to be not rotated by the ring supporters 28. A bottom member 31 is engaged in the other end 23b of the case 23 by means of its screw. The stator 20 is pressed by a spring 32 put in the bottom member 31 and strongly touches the rotary member 26. The pressure of the spring 32 is suitably changed by means of rotation of the bottom member 31.

In the ultrasonic motor of the embodiment in the present invention, when alternating current voltage is applied from an alternating current power supply through the terminals 17a and 18a to the piezoelectric vibrators 15 and 16, the elliptic vibration arises on the end surface 20a of the stator 20 as explained in the above. Therefore, the rotary member 26 touched on the surface 20a of the stator 20 can be smoothly rotated in with a large torque.

When the rotary member 26 or stator 20 is easily abraded, an abrasion resistance member is put between the rotary member 26 and the stator 20 to prevent abrasion.

Figure 9:
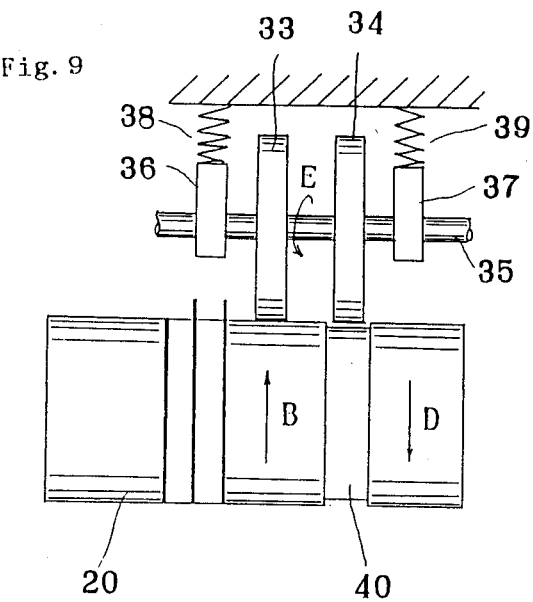
FIG. 9 shows a front view of an ultrasonic driving device of the present invention.

Referring to FIG. 9, another ultrasonic driving device in the present invention is shown. Rotary disks 33 and 34 are fixed on the rotary shaft 35 which is supported to rotate by bearings 36 and 37. Springs 38 and 39 are supported to press the rotary disks 33 and 34 to the side surface of the stator 20. A drain 40 is formed in the dead zone of the stator 20.

In this ultrasonic driving device, when the rotary disk 33 is touched on the side surface of the stator 20 and the rotary disk 34 is put on the drain 40 by shifting the rotary disk 33 or the stator 20, the rotary disk 33 is rotated toward the arrow B. Also, when the rotary member 34 is touched on the side surface of the stator 20 and the rotary disk 34 is put on the drain 40 by shifting the rotary disk 33 or the stator 20, the rotary disk 34 is reversely rotated as shown in the arrow D. When an obliquity is formed on the edges of the drain 40, the shift of the rotary disks 33 and 34 or the stator 20 becomes easy.

Figure 10:
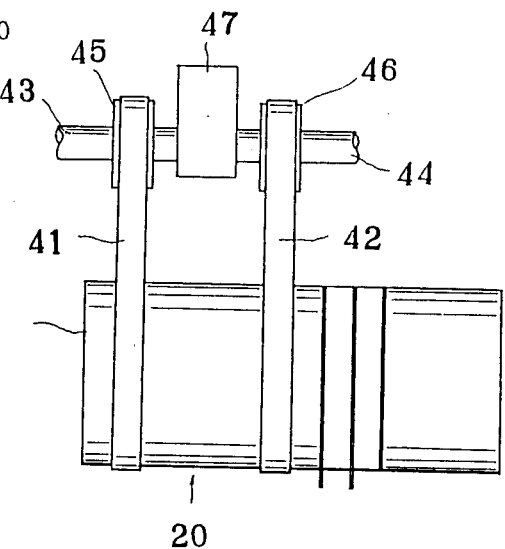
FIG. 10 shows a front view of another ultrasonic driving device of the present invention.

Referring to FIG. 10, a further ultrasonic driving device in the present invention is shown. Belts 41 and 42 are hung between the side of the stator 20 in which the elliptic vibration arises and pulleys 45 and 46 are fixed on rotary shafts 43 and 44 which are supported by a bearing 47.

In this ultrasonic driving device, the rotary shafts 43 and 44 are reversely rotated with respect to each other.

Figure 11:
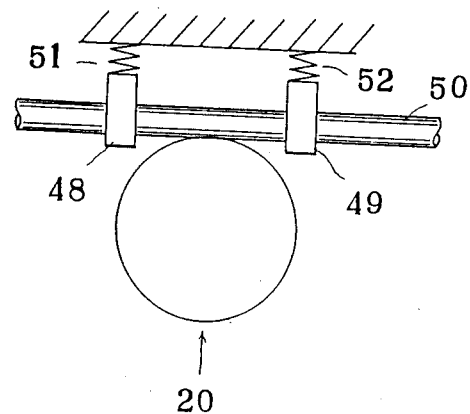
FIG. 11 shows a front view of another ultrasonic driving device of the present invention.

Referring to FIG. 11, a further ultrasonic driving device of the present invention is shown. A shaft 50 is supported by bearings 48 and 49 to be moved linearly and is pressed on the side of the stator 20 at which the elliptic vibration arises by springs 51 and 52.

This ultrasonic driving device can be used as a linear motor.

In the above embodiments, the long metal block 14 of the stator 20 is cylindrical, but the elliptic vibration can arise in a stator formed by a frustconical metal block.

Figure 12:
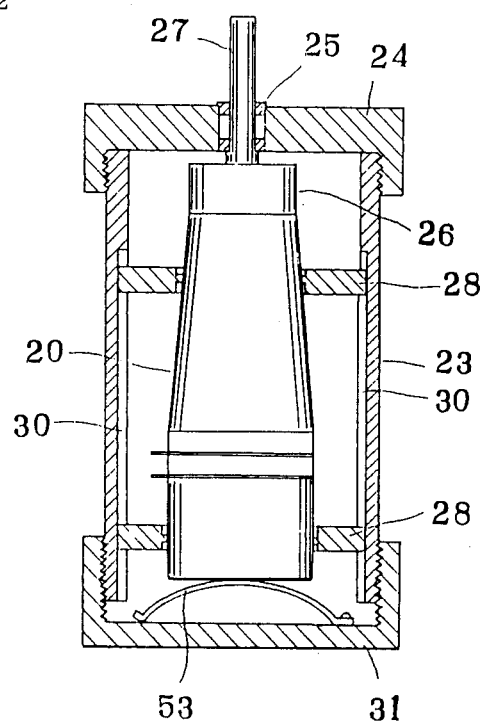
FIG. 12 shows a side view having a sectional view in one part of an ultrasonic motor of the present invention.

Referring to FIG. 12, 23 designates a case; 24; a cap member, 25; a bearing, 26; a rotary member, 27; a rotary shaft, 28; two ring supporters, 30; drains, 31; a bottom member. These elements are the same as those in FIG. 7, but, in the embodiment, the long metal block 14 of the stator 20 is frustconical and a spring 53 consists of an arcuate leaf spring.

Even if the long metal block 14 is frustconical, elliptic vibration arises on the side surface and the end surface of the stator 20 as explained above and the rotary member 26 can be driven, when alternating current voltage is applied to the piezoelectric vibrator of the stator 20.

Figure 13:
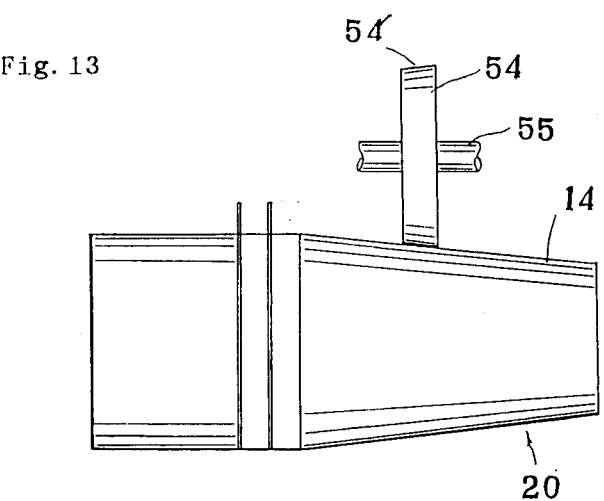
FIG. 13 shows a front view of an ultrasonic driving device of the present invention.

Referring to FIG. 13, a shaft 55 for fixing a rotary member 54 is supported by bearings (not shown) and the oblique surface 54' of the rotary member 54 is touched on the oblique side surface of the frustconical metal block 14 of the stator 20 by springs (not shown).

In the ultrasonic driving device of the present invention, the rotary member 54 is rotated by the elliptic vibration arising on the side surface of the stator 20. The rotary member 55 is engaged with other rotary members through gears or pulleys.

Figure 14:
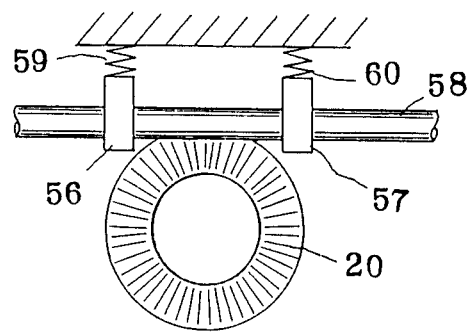
FIG. 14 a front view of an ultrasonic driving device of the present invention.

Referring to FIG. 14, a shaft 58 is supported to longitudinally slide by bearings 56 and 57 and is pressed on the oblique side surface of the stator 20 by springs 59 and 60.

This ultrasonic driving device can be used as a linear motor.

Figure 15:
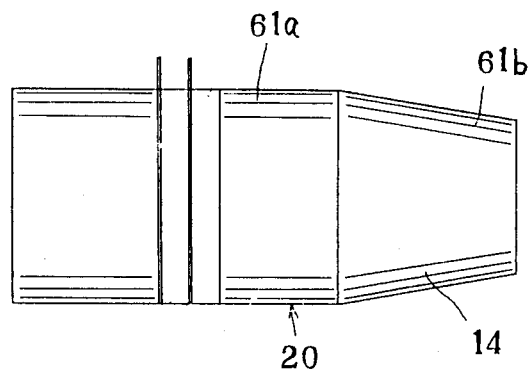
FIGS. 15-20 show side views of stators of the present invention.

Referring to FIG. 15, a long metal block 14 in a stator 20 consists of a cylindrical portion 61a and a frustconical portion 61b.

Figure 16:
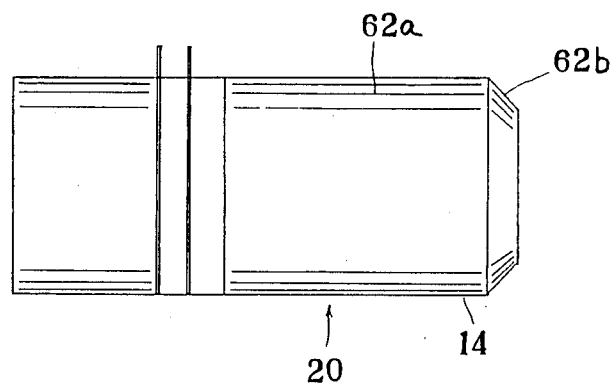

Referring to FIG. 16, a long metal block 14 consists of a long cylindrical portion 62a and a short frustconical portion 62b.

Figure 17:
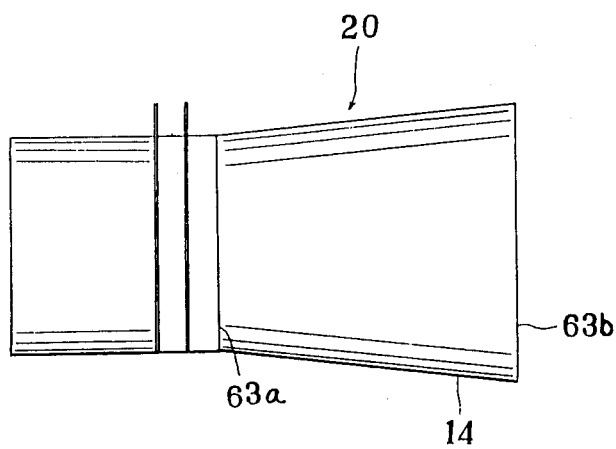

Referring to FIG. 17, a long metal block 14 is frustconical and a small diameter portion 63a of the long metal block 14 is attached to the piezoelectric vibrator of the stator 20 and a large diameter portion 63b is formed in the end of the stator 20.

Figure 18:
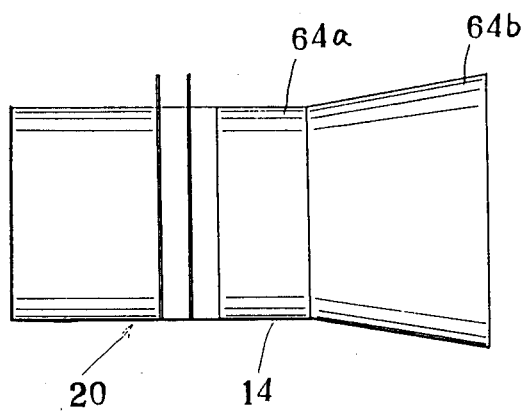

Referring to FIG. 18, a long metal block 14 consists of a cylindrical portion 64a and a frustconical portion 64b. The small diameter portion of the frustconical portion 64b is attached to the cylindrical portion.

Figure 19:
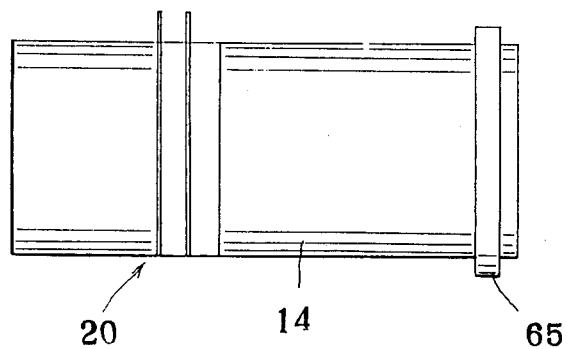

Referring to FIG. 19, a projection 65 is formed on the portion near the end of the long metal block 14 in which the elliptic vibration arises.

Figure 20:
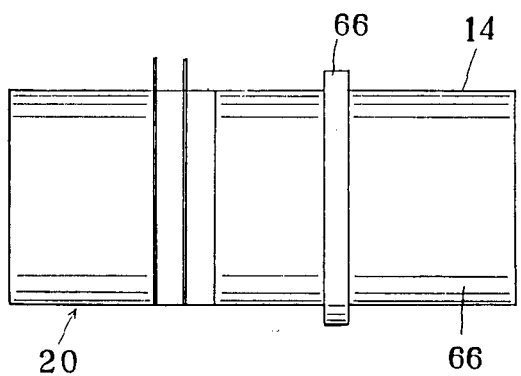

Referring to FIG. 20, a projection 66 is formed on the portion near the center of the long metal block 14 in which the elliptic vibration arises.

Figure 21:
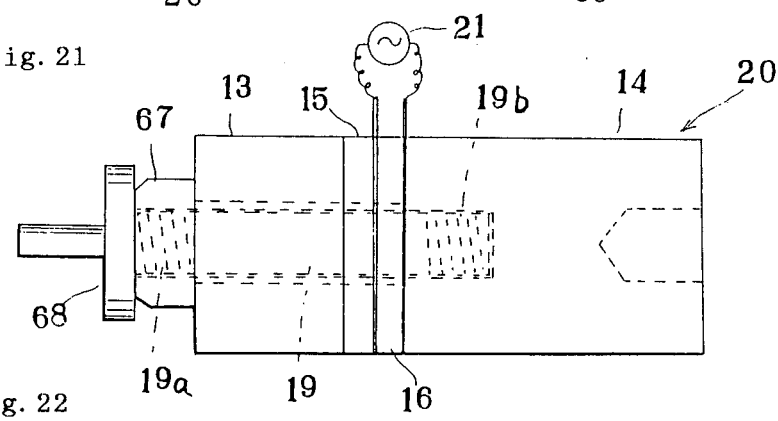
FIG. 21 shows a side view of an ultrasonic driving device in another embodiment in the present invention.

Referring to FIG. 21, an ultrasonic driving device of another embodiment of the present invention is shown. In a stator 20, a screw 19b of a bolt 19 is engaged with a screw hole of a long metal block 14 by means of a screw and the other screw 19a of the bolt 19 is passed through a short metal block 13 and is engaged with a nut 67.

Figure 22:
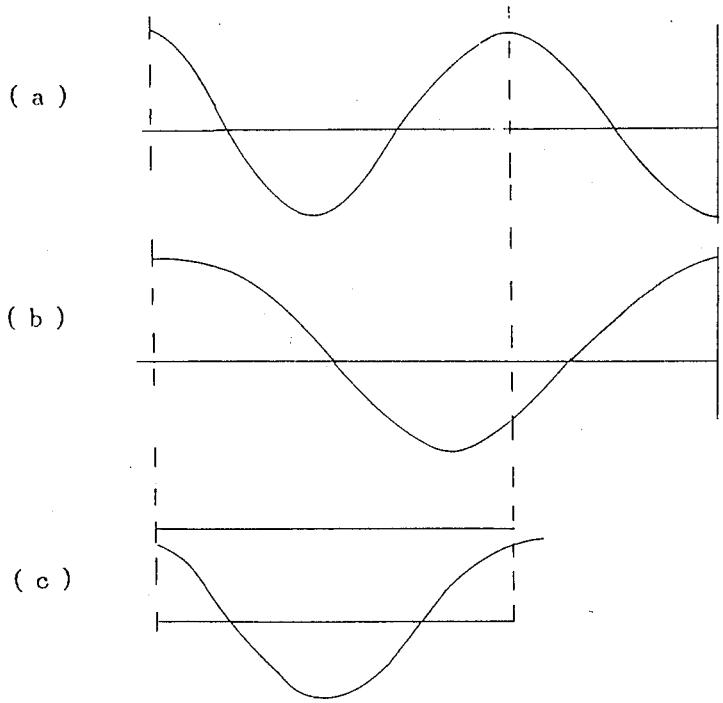
FIG. 22 shows vibration waves generated in each portion of the stator in FIG. 21.

As shown in FIG. 22 (a), the whole length of the stator 20 consisting of the metal blocks 13 and 14, the piezoelectric vibrators 15 and 16 and the nut 67 are matched by a resonance wave {1.5 wave in FIG. 22 (a)} of torsional vibration, the whole length of the stator 20 is matched by a resonance wave {one wave in FIG. 22 (b)} of longitudinal vibration, and the length of bolt 19 is matched by a resonance wave {one wave in FIG. 22} of torsional vibration.

When alternating current voltage is applied from an alternating current power supply 21 to the piezoelectric vibrators 15 and 16, the stator 20 resonates with the longitudinal vibration of the piezoelectric vibrators 15 and 16. Therefore, the stator 20 resonates with the torsional resonance and also the bolt 19 resonates with the torsional resonance. Therefore, strong elliptic vibrations arise on the nut 67 fixed in the end of the bolt.

Thus, when a rotary member 68 is strongly touched to the nut 67, the rotary member 68 is rotated with a strong torque. In this ultrasonic motor, the rotary member 68 can be rotated by a rotating force stronger than that of the prior art ultrasonic driving devices.

Referring to FIG. 23, an ultrasonic motor of another embodiment of the present invention is shown. In a stator 20, piezoelectric vibrators 15 and 16 are put between a long metal block 14 and a short metal block 13 which are fixed by screws 19a and 19b of a bolt 19.

Because it is difficult that this stator 20 is matched by resonance of longitudinal vibration and torsional vibration respectively, a drain 69 is so formed on the side surface of the long metal block 14 that elliptic vibration arises on the side of the drain 69. That is, the drain 69 is formed in a side surface of the long metal block 14 in which the antinode of the resonance of torsional vibration shown in FIG. 24 (a) exist with the antinode of the resonance of longitudinal vibration shown in FIG. 24 (b).

In the stator 20, balls 71 supported in a rotary member 70 are touched on the side wall 69a and a press plate 72 and springs 73 are put between the opposite side wall 69b of the drain 69 and the balls 71. When alternating current voltage is applied to the piezoelectric vibrators 15 and 16, the antinode of the resonance of the longitudinal vibration exists with the antinode of the resonance of the torsional vibration, thus, elliptic vibration and arise on the side wall 69a, and the balls 71 are rotated by the elliptic vibration and the rotary member 70 is rotated by the balls 71. The rotary shaft 74 of the rotary member 70 is supported by a bearing 75 attached on the end surface of the long metal block 14.

Referring to FIGS. 25 and 26, a stator 20 of another embodiment of the present invention is shown. In this stator, piezoelectric vibrators 15 and 16 are put between a long metal block 14 and a short metal block 13 which is engaged with a screw 19a of the bolt 19. The bolt 19 is passed through each hole of the piezoelectric vibrators 15 and 16 and the long metal block 14 and the screw 19b of the bolt 19 is engaged with a nut 76.

Figure 27:
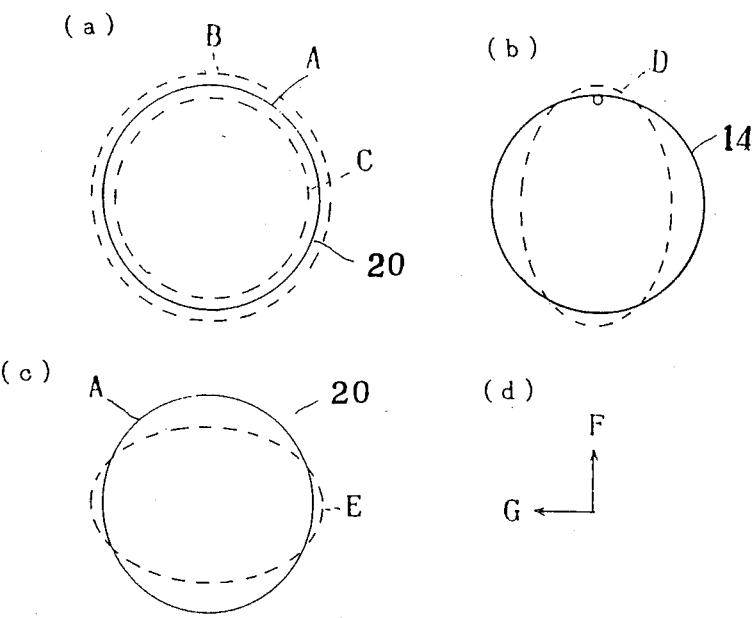
FIG. 27 (a) shows a vibration wave to a radial direction of the stator in FIG. 25.
Figure 28:
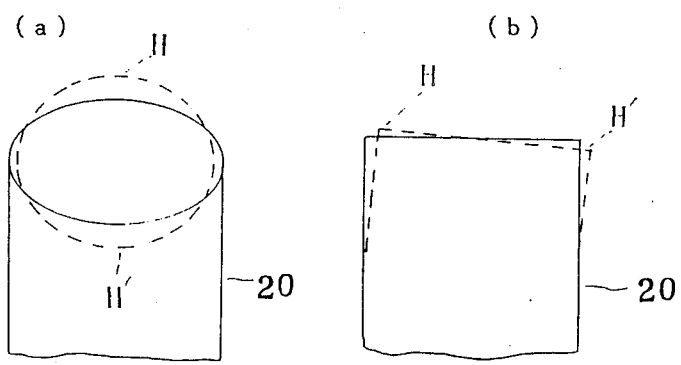
FIGS. 28 (a) and (b) show a perspective view and a side view of an end face of the stator in FIG. 25.

When alternating current voltage is applied to the piezoelectric vibrators 15 and 16 of the stator 20, the long metal block 14 produces a radial vibration in a reference frequency as shown in dotted lines B and C of FIG. 27 (a) toward the inside and out side of a solid line A and the radial vibration of the long metal block 14 produces elliptic vibrations as shown in dotted lines D and E by a second harmonic component. In FIG. 27 (d), assuming that the direction of the elliptic vibrations D and E is designated F, torsional vibration G of the bolt 19 produced by the second harmonic component of the longitudinal vibration is shifted by 90°. Therefore, as shown in dotted line H or H' of FIGS. 28 (a) and (b), rotary vibration is produced by compounding the plane elliptic vibration with the torsional vibration in the end of the long metal block 14.

Therefore, when a rotary member is engaged with the end of the metal block, the rotary member is rotated with a strong torque and because the plane elliptic vibration is applied to the short metal block 13 by the second harmonic component, the whole length of the metal blocks 13 and 14 and the piezoelectric vibrators 15 and 16 becomes short.

Figure 29:
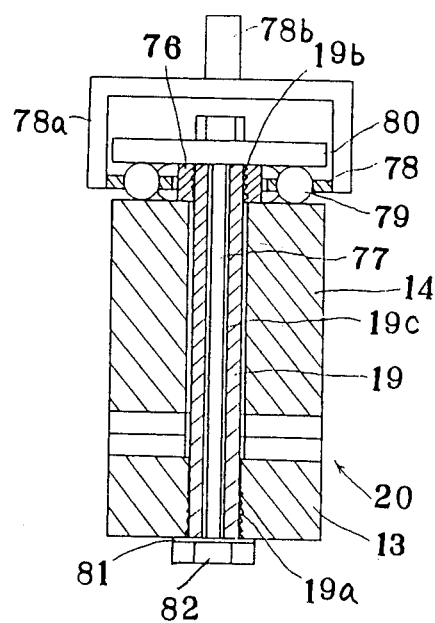
FIG. 29 shows a sectional view of another embodiment of the present invention.

Referring to FIG. 29, another ultrasonic driving device of the present invention is shown. In a stator 20 having metal blocks 13 and 14 and piezoelectric vibrators 15 and 16, a hole 19c is longitudinally opened in the center of a bolt 19 and a bolt 77 is passed through the hole 19c. Also, balls 79 supported by a rotary member 78 are put between a supporter 80 and the end of the stator 20 and the screw of the bolt 77 is engaged with a nut 82 to press the balls 79 to the stator 20. Therefore, rotation power is take out of a rotary shaft 78b of the rotary member 78 through arms 78a.

In the ultrasonic driving device, the balls 79 are moved by the elliptic vibration arising on the end of the long metal block 14 of the stator 20 and thus, the balls 79 are moved to rotate on the surface of the supporter 80. Therefore, the rotary member 78 is driven and a rotary force is taken out of the rotary shaft through the arms 78a.

As stated above, the ultrasonic driving device of the present invention can generate a torque stronger than that of the prior ultrasonic motor and the stator 20 the balls 79 and the rotary member 78 are prevented from abrasion by supplying lubricant of grease and so on.

In the above embodiment of the present invention, though the elliptic vibration is generated on the short metal block 13 by the second harmonic component of the longitudinal vibration, higher harmonic components of the longitudinal vibration may be used.

What is claimed is:

1. An ultrasonic driving device comprising:
    a stator including a long metal block having a side wall and a groove formed in the side wall and a short metal block, the stator having a total length, at least one ring type piezoelectric vibrator positioned between the long metal block and the short metal block, each piezoelectric vibrator being undivided,
    a bolt for fixing the metal blocks and the at least one piezoelectric vibrator, said bolt including screw threads at opposite ends thereof, the screw threads at least one end being threadedly engaged with at least one of said blocks, to produce torsional vibration,
    a single alternating current power supply means for supplying only one resonance frequency signal to said at least one piezoelectric vibrator to produce longitudinal vibration in the total length of said stator and torsional vibration in the total length of the stator due to said longitudinal vibration and said screw threads of the bolt, and
    a driven member engaged with an end surface or side surface of the stator such that the groove is formed at a locus of anti-nodes of the longitudinal vibration of the at least one piezoelectric vibrator and the torsional vibration of the bolt, and the driven member is driven by the side wall of the long metal block in the groove,
    whereby the elliptic vibrations from superposed torsional vibration due to the screw threads of the bolt and longitudinal vibration due to expansion and contraction of the at least one piezoelectric vibrator are generated on the end surface or side surface of the stator and the driven member is driven by the elliptic vibrations.

2. An ultrasonic driving device according to claim 1 wherein abrasion resistance material or material for transmitting vibration are inserted between the end surface or the side surface of the stator and the driven member.

3. An ultrasonic driving device according to claim 1 wherein the long metal block of the stator is cylindrical.

4. An ultrasonic driving device according to claim 1 wherein the end of the long metal block of the stator has a frustconical end.

5. An ultrasonic driving device according to claim 1 wherein the long metal block of the stator has an end and a main body portion and the end is larger than the main body portion.

6. An ultrasonic driving device according to claim 1 wherein the long metal block of the stator includes a frustconical portion and a cylindrical portion.

7. An ultrasonic driving device according to claim 1 wherein the long metal block of the stator has a cylindrical portion and a projection extending from the cylindrical portion.

8. An ultrasonic driving device according to claim 1 wherein a lubricant is supplied to the driven member.

9. An ultrasonic driving device according to claim 1 wherein balls supported in the driven member end of the stator to be pressed by a pressing member.

10. An ultrasonic driving device according to claim 9, wherein a lubricant is supplied to the balls.

11. An ultrasonic driving device comprising a stator including a short metal block having a screw hole threadedly engaged with screw threads at one end of a bolt to produce torsional vibration, at least one piezoelectric vibrator positioned on the short metal block, each piezoelectric vibrator being undivided, a long metal block positioned on the at least one piezoelectric vibrator, a nut engaged with screw threads at the opposite end of the bolt with the bolt being passed through holes of the at least one piezoelectric vibrator and the long metal block, alternating current power supply means for supplying a single high frequency electric signal to said at least one piezoelectric vibrator, and a driven member engaged with the end of the bolt or nut.

12. An ultrasonic driving device according to claim 11 wherein the entire length of the stator defined by the short metal block, the at least one piezoelectric vibrator, the long metal block and nut is matched to the resonance frequency of longitudinal vibration and torsional vibration of the device, and the length of the bolt is matched to the resonance of the torsional vibration, whereby efficiency of output of the elliptic vibration in the nut or the end of the bolt is improved.

13. An ultrasonic driving device according to claim 1 wherein elliptic vibration is compounded radial vibration determined by the radius of the long metal block due to longitudinal vibration in the at least one piezoelectric vibrator, with torsional vibration in the bolt being generated on an end surface of the short metal block.

14. An ultrasonic driving device comprising a cylindrical case having a bearing in one end thereof and a bottom member in the other open end thereof and grooves along an inner surface thereof, a member to be driven positioned in the case and having a rotary shaft rotatably supported with the bearing in the one end of the case, a stator positioned in the case and having supporter means cooperating with said grooves for axially guiding said stator in the case, the stator having a long metal block, a short metal block and piezoelectrical vibrators fixed between the long metal block and the short metal block, each piezoelectric vibrator being undivided, alternating current power supply means for supplying a single high frequency electric signal to said at least one piezoelectric vibrator, and spring means attached to the bottom member for biasing the stator into contact with the member to be driven.

* * * * *